(12) United States Patent
Zhao et al.

(10) Patent No.: US 11,998,899 B2
(45) Date of Patent: Jun. 4, 2024

(54) BIFUNCTIONAL CATALYST FOR DEEP DESULFURIZATION AND GASOLINE QUALITY IMPROVEMENT AND PREPARATION METHOD THEREFOR

(71) Applicant: CHINA UNIVERSITY OF PETROLEUM-BEIJING, Beijing (CN)

(72) Inventors: Liang Zhao, Beijing (CN); Jinsen Gao, Beijing (CN); Butian Xia, Beijing (CN); Lixia Dong, Beijing (CN); Jingye Chen, Beijing (CN); Yuhao Zhang, Beijing (CN); Chunming Xu, Beijing (CN)

(73) Assignee: China University of Petroleum-Beijing, Beijing (CN)

( * ) Notice: Subject to any disclaimer, the term of this patent is extended or adjusted under 35 U.S.C. 154(b) by 249 days.

(21) Appl. No.: 17/390,820

(22) Filed: Jul. 30, 2021

(65) Prior Publication Data

US 2021/0354119 A1    Nov. 18, 2021

Related U.S. Application Data

(63) Continuation of application No. PCT/CN2019/115275, filed on Nov. 4, 2019.

(30) Foreign Application Priority Data

Feb. 1, 2019   (CN) ......................... 201910105544.7
Aug. 2, 2019   (CN) ......................... 201910712210.6

(51) Int. Cl.
| | |
|---|---|
| *B01J 29/40* | (2006.01) |
| *B01J 21/04* | (2006.01) |
| *B01J 23/10* | (2006.01) |
| *B01J 29/70* | (2006.01) |
| *B01J 35/00* | (2006.01) |
| *B01J 37/02* | (2006.01) |
| *B01J 37/04* | (2006.01) |
| *B01J 37/08* | (2006.01) |
| *C10G 45/12* | (2006.01) |

(52) U.S. Cl.
CPC ............ *B01J 29/405* (2013.01); *B01J 21/04* (2013.01); *B01J 23/10* (2013.01); *B01J 29/40* (2013.01); *B01J 29/70* (2013.01); *B01J 35/19* (2024.01); *B01J 37/0201* (2013.01); *B01J 37/0207* (2013.01); *B01J 37/04* (2013.01); *B01J 37/082* (2013.01); *C10G 45/12* (2013.01); *B01J 2229/18* (2013.01); *B01J 2229/20* (2013.01); *C10G 2300/104* (2013.01); *C10G 2300/202* (2013.01); *C10G 2300/4006* (2013.01); *C10G 2300/4012* (2013.01); *C10G 2300/4018* (2013.01); *C10G 2300/70* (2013.01); *C10G 2400/02* (2013.01)

(58) Field of Classification Search
CPC . B01J 29/405; B01J 29/40; B01J 29/70; B01J 21/04; B01J 23/10; B01J 35/0006; B01J 37/0201; B01J 37/0207; B01J 37/04; B01J 37/082; C10G 45/12
See application file for complete search history.

(56) References Cited

U.S. PATENT DOCUMENTS

| | | | |
|---|---|---|---|
| 4,392,945 A | 7/1983 | Howard et al. | |
| 4,668,376 A | 5/1987 | Young et al. | |
| 6,042,719 A * | 3/2000 | Shih ................. | C10G 45/08 |
| | | | 208/143 |
| 6,413,898 B1 | 7/2002 | Faber et al. | |
| 2012/0048778 A1 | 3/2012 | Podrebarac et al. | |

FOREIGN PATENT DOCUMENTS

| | | | |
|---|---|---|---|
| CA | 2890626 A1 | | 5/2014 |
| CN | 101439293 A | | 5/2009 |
| CN | 101844088 A | * | 9/2010 |
| CN | 101844088 A | | 9/2010 |
| CN | 101885983 A | | 11/2010 |
| CN | 101898148 A | | 12/2010 |
| CN | 104667956 A | | 6/2015 |
| CN | 106607096 A | | 5/2017 |
| CN | 106890660 A | | 6/2017 |

(Continued)

OTHER PUBLICATIONS

Lamouri et al., Boletin De La Sociedad Espanola De Ceramica Vidrio, (2017), v56., p. 47-54.*
Cao, Xiru, "Study on Catalyst Preparation and Process for Selective Hydrodesulfurizatio of FCC Gasoline" Chinese University of Petroleum, Master's Theses, Full-Text Database, Engineering Science & Technology 1) Jul. 15, 2016 (Abstract in English provided at pp. ii-iii).

(Continued)

*Primary Examiner* — Yong L Chu
(74) *Attorney, Agent, or Firm* — Pokalsky Wilczynski Brozek, LLP (57) ABSTRACT

Provided are a bifunctional catalyst for deep desulfurization and gasoline quality improvement and a preparation method therefore and a use thereof. The bifunctional catalyst includes a modified catalyst and a loaded active metal, where the modified catalyst carrier is a $\gamma$-$Al_2O_3$ modified with a rare earth element, or the modified catalyst carrier is a composite carrier prepared by mixing and calcinating $\gamma$-$Al_2O_3$ and an acid molecular sieve through a binder, and then modifying with the rare earth element. The bifunctional catalyst for deep desulfurization and gasoline quality improvement can achieve deep desulfurization of high-sulfur fluid catalytic cracking gasoline, and ensure no significant loss of octane number under relatively mild conditions.

13 Claims, 3 Drawing Sheets

(56) References Cited

FOREIGN PATENT DOCUMENTS

| | | | | |
|---|---|---|---|---|
| CN | 108421557 A | | 8/2018 | |
| CN | 108479846 A | | 9/2018 | |
| CN | 108479846 A | * | 9/2018 | ............. B01J 29/40 |
| CN | 201910711695.7 | | 4/2020 | |
| CN | 201910712210.6 | | 4/2020 | |
| CN | 201910711695.7 | | 10/2020 | |
| CN | 201910712210.6 | | 10/2020 | |
| CN | 201910711695.7 | | 3/2021 | |
| CN | 201910712210.6 | | 3/2021 | |
| EP | 0181254 A1 | | 5/1986 | |
| EP | 0970163 B1 | | 4/2005 | |
| WO | 9703150 | | 1/1997 | |
| WO | 9838265 | | 9/1998 | |
| WO | 2011095688 A2 | | 8/2011 | |
| WO | 2011122446 A1 | | 10/2011 | |
| WO | 2020155721 | | 8/2020 | |
| WO | PCT/CN2019/115265 A | | 8/2020 | |

OTHER PUBLICATIONS

Zhang et al., Research progress of ZSM-5 composite material, Inorganic Chemicals Industry, vol. 50, No. 7, Jul. 2018 (English abstract provided).

Liang et al., Study on the Catalysts Supported on Molecular Sieve-Aluminum Composite for FCC Gasoline Isomerization/Hydrodesulfurization, Journal of Chemical Engineering of Chinese Universities, No. 5, vol. 26, Oct. 2012 (English abstract provided).

Study on the Selective Hydrosulfurization Catalyst for FCC Gasoline, Dalian University of Technology, 2016 (English abstract provided).

Hydrotreating Process and Engineering, SINOPEC Press, 2004, ISBN 7-80164-665-7, China (English abstract provided).

USPTO Office Action dated Mar. 15, 2024 in U.S. Appl. No. 17/390,123, pp. 1-12.

* cited by examiner

BIFUNCTIONAL CATALYST FOR DEEP DESULFURIZATION AND GASOLINE QUALITY IMPROVEMENT AND PREPARATION METHOD THEREFOR

CROSS-REFERENCE TO RELATED APPLICATIONS

The present application is a continuation of International Application No. PCT/CN2019/115275, filed on Nov. 4, 2019, which claims priority to Chinese Patent Application No. 201910105544.7, filed on Feb. 1, 2019 and Chinese Patent application No. 201910712210.6, filed on Aug. 2, 2019, all of which are hereby incorporated by reference in their entireties.

TECHNICAL FIELD

The present application relates to petrochemical technologies and, in particular, to a bifunctional catalyst for deep desulfurization and gasoline quality improvement, and a preparation method and a use thereof.

BACKGROUND

In recent years, the exhaust of motor vehicles has caused serious air pollution, for example, frequent haze weather is closely related to the exhaust of motor vehicles. Studies have shown that the sulfur content in oil almost determines the level of all pollutants emitted by motor vehicles. Because of this, increasingly stringent gasoline quality standards have been established in all countries and regions in the world. For example, in the National Standard V of China implemented in January 2017, it requires the sulfur content in gasoline should fall to no more than 10 ppm, olefins should fall to no more than 25 V %, and aromatics should be no more than 40 v %. In the gasoline standard for vehicles in the National Standard VI of China implemented in 2019, in addition to the precondition of the sulfur content falling to less than 10 ppm, it further requires that the olefin content falls to no more than 18 V % and the octane number is kept no less than 92. On the other hand, with continuous exploitation of feed oil, the quality of feed oil becomes worse and worse, and a proportion of medium-sulfur feed oil (the sulfur content is between 500 ppm and 2,000 ppm) and high-sulfur feed oil (the sulfur content is >2000 ppm) is increasing. Under the above double pressure, the importance and severity of desulfurization become more and more prominent. The production and processing of ultra-low sulfur (the sulfur content is no more than 10 ppm) or even sulfur-free gasoline is a great challenge for oil refining and chemical enterprises all over the world.

Fluid Catalytic Cracking (FCC) gasoline is a main blending component for commercial gasoline in China. FCC gasoline approximately accounts for more than 75% of the commercial gasoline, and provides more than 90% of the sulfur content and more than 95% of olefins. Therefore, for China, the key to reduce the sulfur content of commercial gasoline is the desulfurization treatment on FCC gasoline.

Hydrodesulfurization (HDS) technology is the most popular and widely used desulfurization technology in oil refineries. The research and development of a high-performance hydrodesulfurization catalyst is the key of the HDS technology. At present, the most widely used HDS catalyst in the cleaner gasoline production is CoMo-based HDS catalyst. Usually, the $\gamma\text{-}Al_2O_3$ is used as a carrier which is loaded with Co and Mo as active metal components. A traditional CoMo-based HSD catalyst has the advantages of good thermal stability and low price, but is difficult to achieve deep desulfurization under conventional conditions during the treating of higher-sulfur feed oil (such as the sulfur content is >1,500 ppm), especially for fluid catalytic cracking (FCC) gasoline, and the increase of severity of a hydrodesulfurization reaction will lead to a large number of olefin saturation, thereby bringing a large loss of octane number.

Therefore, it is difficult to obtain high-quality gasoline products that meet the current gasoline quality standards by traditional hydrodesulfurization catalysts. Therefore, there is a technical problem to develop of a new type of hydrodesulfurization catalyst so as to achieve deep desulfurization of feed oil, especially for FCC gasoline under mild conditions, and to ensure no more loss of octane number.

SUMMARY

In view of the above defects, the present application provides a hydrodesulfurization catalyst and a preparation method thereof. The hydrodesulfurization catalyst can realize deep desulfurization of high-sulfur feed oil under relatively mild conditions, and ensure no large loss of octane number.

The present application also provides a method for the hydrodesulfurization of gasoline. The catalyst prepared by the method of the present application can make hydrodesulfurization under mild conditions and achieve a smaller octane loss.

To achieve the above objectives, the present application provides a hydrodesulfurization catalyst, which includes a modified catalyst carrier and a loaded active metal. There are two kinds of the modified catalyst carriers: (1) the modified catalyst carrier is a $\gamma\text{-}Al_2O_3$ modified with a rare earth element; (2) the modified catalyst carrier is a composite carrier prepared by mixing and calcinating $\gamma\text{-}Al_2O_3$ and an acid molecular sieve through a binder, and then modifying with the rare earth element.

According to the technical solution provided by the present application, the interaction force between the active metal and the carrier is effectively reduced by introducing the rare earth element into the hydrodesulfurization catalyst. This make the modified hydrodesulfurization catalyst more easily subjects to sulfuration and reduction, thereby enhancing the hydrodesulfurization activity of the hydrodesulfurization catalyst. Moreover, the introduction of the rare earth element can also change the acid property of the surface of the carrier, and new B acid sites on the surface of the hydrodesulfurization catalyst are formed. The formation of the B acid sites is conducive to the fracture of a C—S bond in a thiophene sulfide, thereby promoting the occurrence of direct desulfurization (DDS) reaction path and greatly improving the desulfurization efficiency of the hydrodesulfurization catalyst. Therefore, the hydrodesulfurization catalyst provided by the present application has excellent deep desulfurization ability, and is especially suitable for deep hydrodesulfurization of high-sulfur FCC gasoline (the sulfur content is >1,500 ppm) under relatively mild conditions. Furthermore, the octane number would not be greatly reduced.

Rare earth element is a general name for 17 elements of lanthanide elements, yttrium (Y) and scandium (Sc) in the Periodic Table of Elements. In some embodiments of the present application, the rare earth element used is selected from at least one of lanthanum (LA), cerium (Ce), praseodymium (Pr), and yttrium (Y), and preferably, it can be La and/or Ce.

Reasonable control of the loading amount of the rare earth element in the hydrodesulfurization catalyst is beneficial for further improvement of the hydrodesulfurization activity and the hydrodesulfurization efficiency of the hydrodesulfurization catalyst. In a preferred embodiment of the present application, the mass content of the rare earth element in the hydrodesulfurization catalyst is 0.5-5.0 wt %, preferably 0.5-3.0 wt % based on the mass of an oxide with respect to the mass of the hydrodesulfurization catalyst. For example, in some embodiments of the present application, the rare earth element is La, and the mass content of $La_2O_3$ in the hydrodesulfurization catalyst is 0.75-3%. In other embodiments of the present application, the rare earth element is Ce, and the mass content of $CeO_2$ in the hydrodesulfurization catalyst is 0.5-2% or 0.75-3%.

The hydrodesulfurization catalyst provided by the present application especially can be obtained by loading an active metal on the modified catalyst carrier by impregnation method, then aging, drying, and calcinating.

In some embodiments of the present application, the modified catalyst carrier is obtained by loading a rare earth compound on $\gamma$-$Al_2O_3$ by the impregnation method, and then aging, drying, and calcinating. In some embodiments of the present application, the modified catalyst carrier is obtained by mixing and calcinating $\gamma$-$Al_2O_3$ and an acid molecular sieve through a binder to prepare a composite carrier, then loading the rare earth compound on the composite carrier by the impregnation method, and then aging, drying, and calcinating.

Specifically, the modified catalyst carrier is obtained by loading an impregnating solution containing the rare earth compound on $\gamma$-$Al_2O_3$ or a mixture of $\gamma$-$Al_2O_3$ and the acid molecular sieve by an equal volume impregnation method, and then aging at room temperature (20-25° C.) for 6-12 h, drying at 100-160° C. for 4-8 h, and calcining at 500-700° C. for 4-8.

The rare earth compound specifically can be one or more of a rare earth oxide, a rare earth chloride, and a rare earth nitrate, such as lanthanum nitrate, cerium chloride, etc. A calcination atmosphere can be nitrogen, argon, helium, etc.

As mentioned above, for the hydrodesulfurization catalyst provided by the present application, its modified catalyst carrier is $\gamma$-$Al_2O_3$ modified with a rare earth element, or $\gamma$-$Al_2O_3$ blending with the acid molecular sieve and modified with the rare earth element. The acid molecular sieve refers to a molecular sieve with acid catalytic function. The acid molecular sieve used in the present application can be selected from but not limited to the following molecular sieves: one or more of the ZSM series molecular sieve, the MCM series molecular sieve, the SAPO series molecular sieve and the beta molecular sieve ($\beta$ Molecular sieve). The ZSM series molecular sieve can be one or more of the ZSM-5 molecular sieve, the ZSM-8 molecular sieve, the ZSM-11 molecular sieve, the ZSM-35 molecular sieve, and the like, and the ZSM-5 molecular sieve is preferred. The MCM series molecular sieve can be one or more of the MCM-22 molecular sieve, the MCM-36 molecular sieve, the MCM-41 molecular sieve, and the like, and the MCM-41 molecular sieve is preferred. The SAPO series molecular sieve can be one or more of the SAPO-5 molecular sieve, the SAPO-11 molecular sieve, the SAPO-34 molecular sieve, and the like, and the SAPO-34 molecular sieve is preferred.

By using the acidic molecular sieve as a doping agent of $\gamma$-$Al_2O_3$, not only more acid centers can be introduced, but also the ratio of Bronsted acid sites (BAS) and Lewis acid sites (LAS) on the surface of the hydrodesulfurization catalyst can be adjusted, thereby promoting the progress of hydrodesulfurization reaction and improving desulfurization rate.

When the carrier contains $\gamma$-$Al_2O_3$ and the acid molecular sieve, the mass ratio of $\gamma$-$Al_2O_3$ to the acid molecular sieve can be (9-1): 1, preferably 4-8:1.

For the hydrodesulfurization catalyst provided by the present application, the loaded active metal can be selected from at least two elements of VIB Group and VIII Group in the Periodic Table of Elements, and in particular can include at least one VIB Group element and at least one VIII Group element. The VIB Group element can be, for example, Cr, Mo, and W; the VIII Group element can be, for example, Fe, Co, Ni, Ru, Rh, Pd, Os, Ir, and Pt. In a preferred embodiment of the present application, Mo and Co are usually selected together as the active metal.

It is beneficial to improve the hydrodesulfurization effect of the hydrodesulfurization catalyst by reasonably adjusting the element composition in the active metal. In a specific implementation process of the present application, usually, the mole ratio of a VIB Group element to a VIII Group element is 1:0.1-0.6, for example, Mo and Co are used as the active metal, where the atomic mole ratio of Mo to Co is 1:0.1-0.6.

In some embodiments of the present application, the active metal accounts for 3-25%, further 10-25% of the total mass of the hydrodesulfurization catalyst based on the mass of an oxide of the active metal with respect to the total mass of the hydrodesulfurization catalyst. For example, when Mo and Co are used as the active metal, the mass fraction of $MoO_3$ in the hydrodesulfurization catalyst is 5-14%, preferably 10.5-14.0%, and the mass fraction of CoO is 1-10%, preferably 3.0-4.0%.

The present application also provides a preparation method of the hydrodesulfurization catalyst as follows:

loading a rare earth element on $\gamma$-$Al_2O_3$ by an impregnation method, then aging, drying, and calcinating to obtain a modified catalyst carrier; loading an active metal on the modified catalyst carrier by the impregnation method, and then aging, drying, and calcinating to obtain the hydrodesulfurization catalyst; or mixing and calcinating $\gamma$-$Al_2O_3$ with an acid molecular sieve through a binder to prepare a composite carrier, then loading the rare earth element on the composite carrier by the impregnation method, and then aging, drying, and calcinating to obtain the modified catalyst carrier; loading the active metal on the modified catalyst carrier by the impregnation method, and then aging, drying, and calcinating to obtain the hydrodesulfurization catalyst.

Specifically, the carrier is obtained by loading an impregnation solution containing a rare earth compound on $\gamma$-$Al_2O_3$ or the composite carrier by an equal volume impregnation method, and then aging at room temperature (20-25° C.) for 6-12 h, drying at 100-160° C. for 4-8 h, and calcining at 500-700° C., preferably 540-700° C. for 4-8 h.

The rare earth compound can be one or more of a rare earth oxide, a rare earth chloride, and a rare earth nitrate, such as lanthanum nitrate, cerium chloride, etc. A calcination atmosphere can be nitrogen, argon, helium, etc.

Of course, if the modified catalyst carrier is the composite carrier mentioned above, the binder can be a binder that is common in the preparation processes of catalysts, such as amino trimethylene phosphonic acid (ATMP), polyvinylpyrrolidone (PVP), sesbania powder, etc. The addition of an appropriate amount of the binder is useful for the preparation of the composite carrier with excellent performance, uniform distribution, and moderate acidity, for example, the binder: γ-$Al_2O_3$+acid molecular sieve=1.5-3:1 (mass ratio).

The present application does not specifically limit the specific way in which the active metal can be loaded on the modified catalyst carrier. In some embodiments of the present application, the equal volume impregnation method is used to load the active metal on the modified catalyst carrier. Specifically, the hydrodesulfurization catalyst is obtained by loading the impregnation solution containing the active metal compound on the modified catalyst carrier, and then aging, drying, and calcinating.

In particular, in addition to water and the active metal compound, the impregnation solution for loading the active metal also includes an organic complexing agent (or called as an organic chelating agent). The organic complexing agent is used to improve the dispersion of the active metal on the carrier, so as to reduce the interaction force between the active metal and the carrier, thereby improving the sulfurization degree and desulfurization effect of the hydrodesulfurization catalyst. The organic complexing agent that meets the above requirements can be specifically selected from more than one of organic compounds that have two carboxyl groups in a molecular structure and are soluble in water, such as citric acid CA, tartaric acid TA, and ethylenediaminetetraacetic acid.

In the process of preparing the impregnation solution, the mass ratio of the organic complexing agent to water usually is 1:1-3. In some embodiments of the present application, when the impregnation solution is prepared, the molar ratio of the organic complexing agent to a VIII Group element usually is 0.3-2:1. For example, when Co and Mo are used together as the active metal, the molar ratio of the organic complexing agent to molybdenum is 0.5-2:1.

Specifically, the above active metal compound can be carbonate, nitrate, and other metal salts corresponding to the active metal. For example, if Co and Mo are used together as the metal active component, a Co source can be basic cobalt carbonate, cobalt nitrate and so on, and a Mo source can be ammonium heptamolybdate, molybdenum pentachloride and so on. In a specific implementation process of the present application, based on the mass of an oxide with respect to the mass of the hydrodesulfurization catalyst, the mass fraction of $MoO_3$ in the impregnation solution usually is 7-20%, preferably 7-15%; the mass fraction of CoO in the impregnation solution usually is 1-8%, preferably 2-8%.

Specifically, for the above aging, drying, and calcinating, the loading of the active metal is completed by aging at room temperature for 6-12 h, then drying at 80-120° C. for 6-12 h, and then calcinating at 450-600° C. for 4-8 h to obtain the hydrodesulfurization catalyst. A calcination atmosphere can be one of nitrogen, argon, and helium.

The hydrodesulfurization catalyst of the present application can be in a shape by extrusion moulding to meet environment requirements of applications. For example, the hydrodesulfurization catalyst can be prepared into particles of a clover shape, a cylindrical shape, a spherical shape, and other shapes.

The present application also provides a method for the hydrodesulfurization of gasoline, in which the above-mentioned hydrodesulfurization catalyst is used.

Specifically, the hydrodesulfurization catalyst can be subjected to prevulcanization at first, and then the gasoline is subjected to a hydrodesulfurization treatment. The gasoline can be full-fraction gasoline or heavy-fraction gasoline, especially FCC gasoline with a sulfur content of more than 1,500 ppm. Reaction conditions of the prevulcanization are a temperature of 300-500° C., a hydrogen partial pressure of 1.5-2.5 MPa, a hydrogen to oil volume ratio (i.e. a ratio of hydrogen volume to oil volume, H/O for short) of 200-350, and a prevulcanization time of 8-12 h.

From further studies, the optimal process conditions for the hydrodesulfurization of gasoline using the hydrodesulfurization catalyst are a temperature of 250-300° C., a hydrogen partial pressure of 1.5-3.0 MPa, a hydrogen to oil volume ratio of 150-350, and a space velocity of 3-8 $h^{-1}$. Hydrodesulfurization under this mild condition not only can achieve deep desulfurization, but also can reduce olefin saturation to a certain extent and avoid a large loss of octane number.

In conclusion, the present application provides a bifunctional catalyst for deep desulfurization and gasoline quality improvement, and a preparation method and uses thereof, which has the following beneficial effects:

for the hydrodesulfurization catalyst provided by the present application, it has excellent deep desulfurization ability by introducing the rare earth element. Under mild conditions (temperature 260-300° C., hydrogen partial pressure 1.5-3.0 MPa), high-sulfur FCC gasoline (the sulfur content is >1500 ppm) is subjected to hydrodesulfurization, the desulfurization rate can reach to more than 98.5%, so that the sulfur content in a gasoline product obtained is no more than 40 ppm, even can reach to no more than 10 ppm, thereby realizing deep desulfurization.

In addition, compared with a catalyst without modification with the rare earth, the hydrodesulfurization catalyst has more excellent olefin protection function. In the process of hydrodesulfurization, the hydrodesulfurization reaction of sulfides is more likely to happen, which reduces the olefin saturation. Therefore, the hydrodesulfurization catalyst can achieve deep desulfurization on high-sulfur FCC gasoline, and the loss of octane number is less than 2.5 units or even lower, thereby avoiding a large loss of octane number.

DESCRIPTION OF EMBODIMENTS

In order to make the objectives, technical solutions and advantages of embodiments of the present application clearer, the technical solutions in the embodiments of the present application will be described clearly and comprehensively in combination with the accompanying drawings in the embodiments of the present application. Apparently, the described embodiments are a part rather than all the embodiments of the present application. Based on the embodiments in the present application, all other embodiments obtained by persons of ordinary skill in the art without creative work belong to the protection scope of the present application.

Example 1

The present example provides a hydrodesulfurization catalyst as follows:

1. preparing a certain concentration of a rare earth element impregnation solution by deionized water, and then impregnating the rare earth element impregnation solution on γ-Al₂O₃ by an equal volume impregnation method, adding a certain amount of ammonia water to improve dispersion of the impregnation solution during the impregnation process, after the impregnating is completed, aging at room temperature for about 12 h, drying at 120° C. for about 8 h, and calcinating at 540° C. for about 4 h to obtain a carrier modified with the rare earth (named as GZ carrier).

2. taking an appropriate amount of water, stirring and heating to 40° C., adding citric acid CA (CA/Co=1.5), and stirring until completely dissolved; then adding 2.5 g cobalt carbonate, and stirring until no bubble; slowly raising the temperature of a solution to a boiling state to dissolve all materials (no bubble forms), stopping heating, cooling down to room temperature, then stopping stirring; adding ammonia water to 85% of a final volume, then slowly adding ammonium heptamolybdate and stirring until completely dissolved, supplementing ammonia water to the final volume so as to obtain an active metal impregnation solution, sealed storing and reserving.

3. loading the active metal impregnation solution prepared in the step 2 on the AZ composite carrier prepared in the step 1 by the equal volume impregnation method, and then stirring for 10 min after saturation, ageing at room temperature for 12 h, drying at 100° C. for 8 h, calcinating at 540° C. for 4 h, to obtain the catalyst modified with the rare earth element, named as GZ-1, and its specific components are shown in Table 1.

Comparative Example 1

The present Comparative Example provides a CoMo/γ-Al₂O₃ catalyst, its preparation method is as follows: γ-Al₂O₃ is not treated, the preparation process of an active metal impregnation solution and an equal volume impregnation method are the same as those in the steps 2-3 of Example 1, respectively, the components of this catalyst are shown in Table 1.

Example 2

The present example provides a hydrodesulfurization catalyst, and the preparation steps are basically the same as those in Example 1, except that: the loading amount of the rare earth element Ce is increased by 50% compared with Example 1, and the obtained catalyst is named as GZ-2. The specific components of this catalyst are shown in Table 1.

Example 3

The present example provides a hydrodesulfurization catalyst, and the preparation steps are basically the same as those in Example 1, except that: the rare earth element Ce is changed to La, the loading amount of the rare earth element La is basically consistent with that of Ce in Example 2, and the obtained catalyst is named as GZ-3.

Example 4

The present example provides a hydrodesulfurization catalyst modified with a rare earth element and an acid molecular sieve, and its preparation process is as follows:
1. mixing γ-Al₂O₃ and ZSM-5 in a mass ratio of about 8:1, and then adding PVP to mix evenly, where the mass of PVP is twice of a sum of the mass of γ-Al₂O₃ and ZSM-5, and then drying at 120° C. for 8 h and calcining at 500° C. for 4 h, to obtain a γ-Al₂O₃/ZSM-5 composite carrier.
2. impregnating the rare earth element Ce on the composite carrier according to the steps of Example 1, and the loading amount of Ce is the same as that in Example 1, and the prepared catalyst is named as GZ-4.

Figure 1:
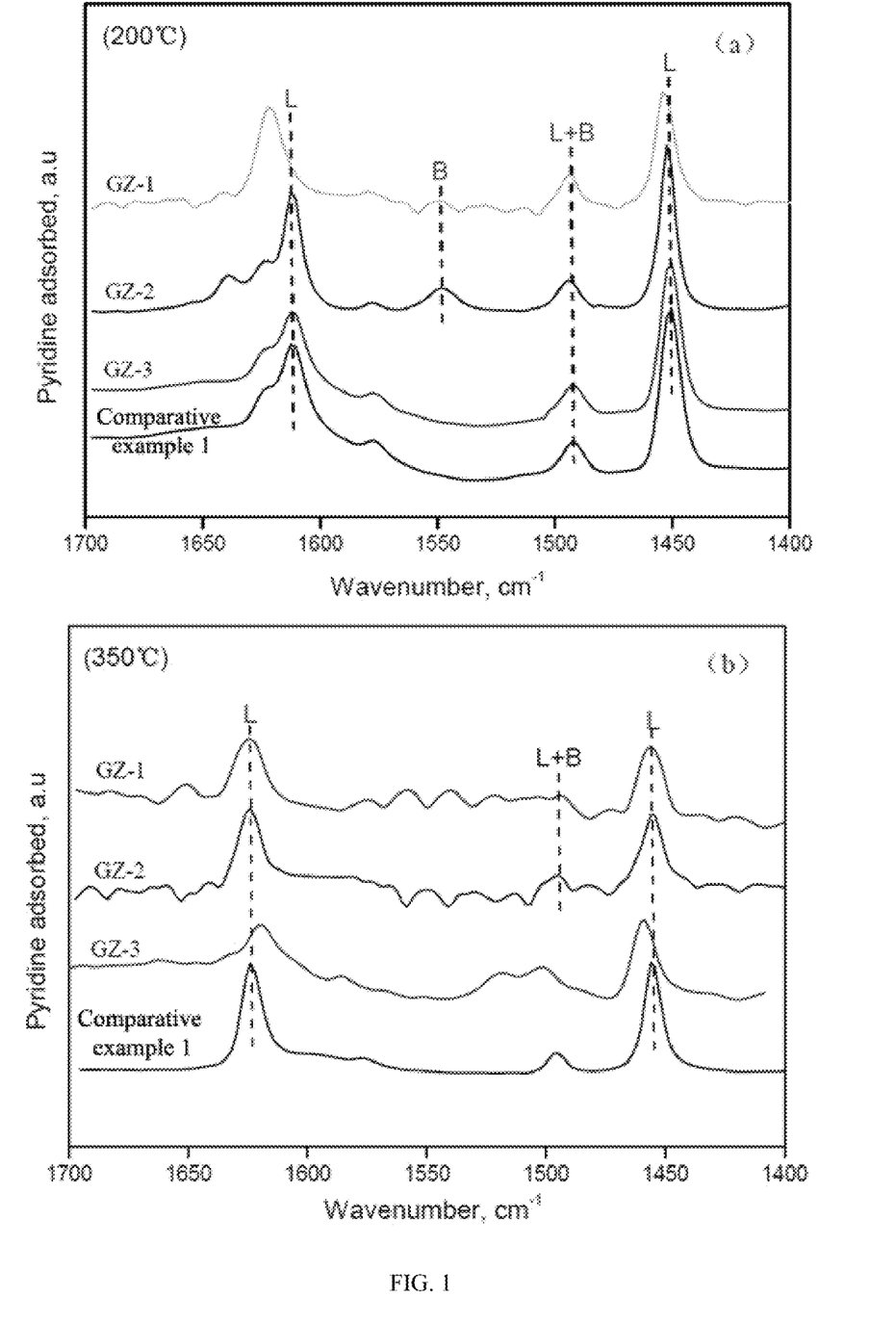
FIG. 1 is a Py-FTIR diagram of hydrodesulfurization catalysts provided by Examples 1-3 and Comparative Example 1.

FIG. 1 is a Py-FTIR diagram of the hydrodesulfurization catalysts provided by the above Examples 1-3 and Comparative Example 1, in which FIG. 1(a) obtained at 200° C. is used to calculate a total acid content of the hydrodesulfurization catalysts, and FIG. 1(b) obtained at 350° C. is used to calculate a medium strong acid content of the hydrodesulfurization catalysts.

Figure 2:
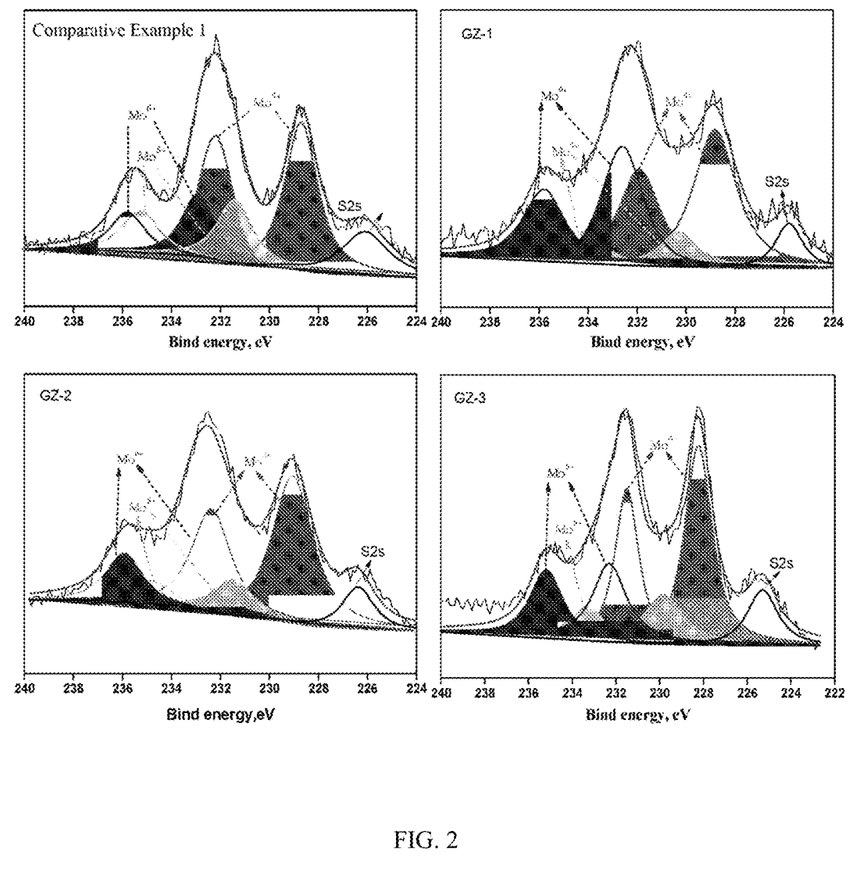
FIG. 2 is a XPS diagram of Mo3d of hydrodesulfurization catalysts provided by Examples 1-3 and Comparative example 1.

The hydrodesulfurization catalysts in the above Examples 1-3 and Comparative Example 1 are taken to put in a fixed bed reactor having an inner diameter of 8 mm, and the hydrodesulfurization catalysts are subjected to prevulcanization by 3 wt % $CS_2$ solution as a prevulcanization solution. Prevulcanization reaction conditions are as follows: T=340° C., P=2.5 MPa, hydrogen to oil ratio (H/O)=300, space velocity=2 $h^{-1}$, and a prevulcanization time is 6 h. Samples of the hydrodesulfurization catalysts after prevulcanization and before reaction are characterized and tested. The XPS results are shown in FIG. 2.

Figure 3:
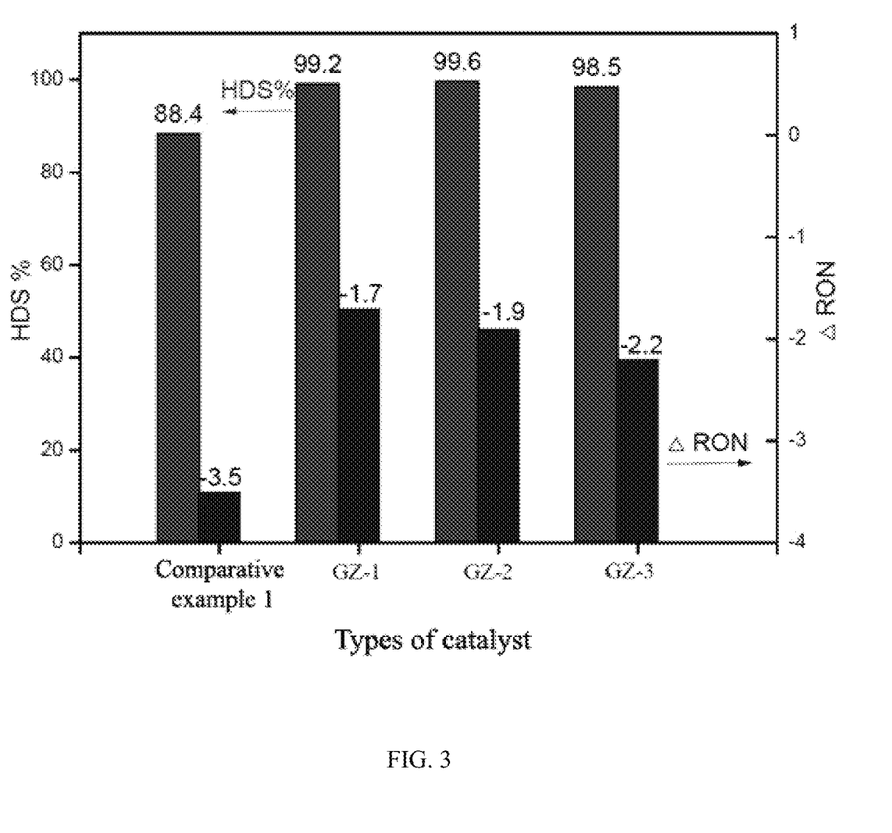
FIG. 3 shows hydrogenation reaction results of hydrodesulfurization catalysts provided by Examples 1-3 and Comparative example 1 to North China heavy fraction gasoline.

After the prevulcanization reaction is completed, the hydrodesulfurization performance of the hydrodesulfurization catalysts is tested on North China heavy fraction gasoline (distillation range 102-194° C., sulfur content 1,538 ppm, research octane number RON=88.9), Jingbo heavy fraction gasoline (distillation range 104-185° C., sulfur content 2,276 ppm, RON=87.8), and Golmud heavy fraction gasoline (distillation range 86-180° C., sulfur content 1,854 ppm, RON=90.2) as feedstocks. The reaction conditions are as follows: T=260° C., P=2 MPa, hydrogen to oil ratio (H/O)=300, space velocity=3.5 The hydrogenation reaction results of the North China heavy fraction gasoline are shown in FIG. 3.

According to reports, the characteristic peaks near 1,450 $cm^{-1}$ and 1,622 $cm^{-1}$ are the characteristic absorption peaks of Lewis acid (L acid for short), and the characteristic absorption peak near 1,542 $cm^{-1}$ is the characteristic absorption peak of Bronsted acid (B acid for short). It can be seen from FIG. 1 that the hydrodesulfurization catalysts provided by Examples 1-3 have a clear distinction from the unmodified CoMo/γ-Al₂O₃ catalyst of Comparative Example 1 in physicochemical properties, which especially shows that the introduction of different types of rare earth elements will lead to a significant decrease in the peak strength of the characteristic peaks of L-acid of the hydrodesulfurization catalysts. This may be due to the reaction between the rare earth element and Al—OH on the surface of the carrier during the preparation of the hydrodesulfurization catalyst, resulting in neutralization of a part of L-acid.

In addition, after the CoMo/γ-Al₂O₃ catalyst is modified with the rare earth element Ce (GZ-1 and GZ-2), the characteristic absorption peak of B-Acid is observed in the spectrogram obtained at 200° C., which indicates that there are a certain amount of L acid and B acid distributed on the surface of the CoMo/γ-Al₂O₃ catalyst modified with the rare earth element Ce. Compared with GZ-1, GZ-2 has a stronger B acid center. Previous studies have shown that the presence of B acid site is conducive to the fracture of the C—S bond in a thiophene sulfide, thereby promoting the occurrence of DDS (direct desulfurization) pathway and improving hydrodesulfurization reaction efficiency. Therefore, it can be concluded from this that GZ-2 should have better hydrodesulfurization performance than GZ-1, which can be confirmed from Table 2.

In addition, it can be seen from FIG. 1 that the hydrodesulfurization catalyst modified with the rare earth element La (GZ-3) does not show obvious characteristic peak of B acid. It is speculated that the improvement of its hydrodesulfurization activity is mainly due to that the introduction of La reduces the interaction between the carrier and the active metal, thereby facilitating the formation of more $MoS_2$ active phase. It is precisely because the effect of the introduction of La on the acidity of the hydrodesulfurization catalyst is mainly reflected on the reduction of the content of L acid, and there is no obvious effect on the formation of B acid, therefore, the hydrodesulfurization performance of GZ-3 is not as good as that of GZ-2 catalyst, which can also be confirmed from Table 2.

As shown in FIG. 2, it can be seen from XPS results by X-ray photoelectron spectroscopy that the $Mo_3d$ spectrums of the sulfurized catalysts contain the following three double-peaks: a double peak with bind energy of 229.1±2 and 232.3±1 eV are the characteristic peak of $MoS_2$ species; a double-peak with a binding energy of 231.2±0.1 and 235.2±0.1 eV is the characteristic peak of $MoS_xO_y$ species; a double-peak with a bind energy of 233.2±1 and 236±0.1 eV is the characteristic peak of $Mo^{6+}$ species. It can be seen from FIG. 2 that under the same prevulcanization conditions, the sulfurization degree of the hydrodesulfurization catalysts modified with rare earth elements is higher, with more $MoS_2$ active phase. Taking the comparison of the Comparative Example 1 and Example 3 as an example, the content of $MoS_2$ active phase in the unmodified CoMo/γ-$Al_2O_3$ catalyst in Comparative Example 1 is 45.2%, and the relative content of $MoS_xO_y$ species (an incomplete sulfurized product) is 25.1% which is the highest; the content of the $MoS_2$ active phase in the hydrodesulfurization catalyst modified with the rare earth element La in Example 3 is 61.9%, and the relative content of $MoS_xO_y$ species is 15.5%. It can be concluded that the introduction of the rare earth element can promote sulfidation and reduction of Mo species, and is conducive to the formation of more $MoS_2$ active phase, thereby enhancing hydrodesulfurization effect of the hydrodesulfurization catalyst.

TABLE 1

Components of catalyst (mass fraction, wt %)

| | γ-$Al_2O_3$ | ZSM-5 | $La_2O_3$ | $CeO_2$ | CoO | $MoO_3$ |
|---|---|---|---|---|---|---|
| Comparative Example1 | 79.7 | — | — | — | 3.5 | 13.6 |
| GZ-1 | 78.9 | — | — | 0.75 | 3.7 | 13.4 |
| GZ-2 | 78.1 | — | — | 1.50 | 3.8 | 13.4 |
| GZ-3 | 78.2 | — | 1.50 | — | 3.6 | 13.5 |
| GZ-4 | 70.4 | 8.9 | — | 0.75 | 3.5 | 13.3 |

Note:
"—" represents none; the sun of components of the above catalysts is less than 100% due to that the industrial grade γ-$Al_2O_3$ used has a certain amount of impurities.

TABLE 2

Hydrogenation performance of different catalysts

| | North China heavy fraction gasoline (1,538 ppm) | | Jingbo heavy gasoline fraction (2,276 ppm) | | Golmud heavy fraction gasoline (1,854 ppm) | |
|---|---|---|---|---|---|---|
| | Sulfur content (ppm) | Desulfurization rate (%) | Sulfur content (ppm) | Desulfurization rate (%) | Sulfur content (ppm) | Desulfurization rate (%) |
| Comparative Example 1 | 178 | 88.4 | 269 | 88.2 | 142 | 92.3 |
| GZ-1 | 13 | 99.2 | 21 | 99.1 | 18 | 99.0 |
| GZ-2 | 6 | 99.6 | 10 | 99.6 | 10 | 99.5 |
| GZ-3 | 22 | 98.5 | 34 | 98.5 | 23 | 98.7 |
| GZ-4 | 39 | 97.5 | 52 | 97.9 | 43 | 97.7 |

TABLE 3

Changes of olefin and octane number (RON) on different catalysts

| | North China heavy fraction gasoline (O = 23.80 wt %) | | Jingbo heavy fraction gasoline (O = 15.72 wt %) | | Golmud heavy fraction gasoline (O = 24.48 wt %) | |
|---|---|---|---|---|---|---|
| | Olefin (wt %) | ΔRON | Olefin (wt %) | ΔRON | Olefin (wt %) | ΔRON |
| Comparative Example 1 | 5.51 | −3.5 | 3.12 | −2.8 | 4.08 | −3.9 |
| GZ-1 | 11.87 | −1.7 | 9.54 | −1.5 | 10.02 | −2.0 |
| GZ-2 | 10.59 | −1.9 | 8.61 | −1.7 | 9.88 | −2.0 |
| GZ-3 | 9.43 | −2.2 | 8.23 | −1.7 | 8.97 | −2.3 |
| GZ-4 | 12.60 | −1.2 | 9.89 | −1.0 | 10.54 | −1.6 |

It can be seen from Table 2 that the hydrodesulfurization catalyst modified with the rare earth using the method of the present application has very excellent desulfurization performance on high-sulfur FCC gasoline (the sulfur content is >1,500 ppm). Under relatively mild reaction conditions (T=260° C., P=2 MPa), the desulfurization rate can reach to more than 98.5%, and the sulfur content can fall to no more than 35 ppm, and the deep desulfurization is realized.

It can be seen from further comparison of GZ-1, GZ-2 and GZ-3 that the hydrodesulfurization effect of GZ-1 and GZ-2 obtained after being modified with the rare earth element Ce is better than that of GZ-3 obtained after being modified with the rare earth element La. According to the comparison result of GZ-1 and GZ-2, changing the content of the rare earth element has an very obvious influence on the hydrodesulfurization effect. Appropriately increasing the loading amounts of the rare earth element is conducive to the deep desulfurization of gasoline. For example, the sulfur content in the gasoline products could fall to no more than 10 ppm when GZ-2 is used.

In addition, according to the result of Example 4, when the rare earth element Ce and the acidic molecular sieve (ZSM-5 molecular sieve) are used together to modify the catalyst, the octane number protection ability of the obtained GZ-4 catalyst is better than the other three examples, but the desulfurization effect is lower than the other examples.

Moreover, as shown in Table 3, it can be seen from the composition of the product oils, the olefin contents of the product oils obtained after the high-sulfur FCCs are subjected to hydrodesulfurization using the hydrodesulfurization catalysts in Examples 1-3 are higher than that of the unmodified CoMo/γ-$Al_2O_3$ catalyst. This shows that the hydrodesulfurization catalysts modified with the rare earth element have more excellent olefin protection function than the unmodified CoMo/γ-$Al_2O_3$ catalyst. In the process of hydrodesulfurization, it is more prone to occur the hydrogenation removal reaction of sulfides, which reduces olefin saturation to a certain extent, thereby improving selectivity of hydrodesulfurization reaction/olefin hydrogenation saturation reaction.

It can be seen from Tables 2 and 3 and FIG. 3 that the hydrodesulfurization catalyst provided by the present application can not only meet deep desulfurization of high-sulfur FCC gasoline, at the same time but also reduce the loss of octane number. Taking the North China heavy fraction gasoline as an example, the loss of octane number caused by the unmodified CoMo/γ-$Al_2O_3$ catalyst thereto in Comparative Example 1 is up to 3.5 units. The loss of octane number caused by the hydrodesulfurization catalysts in Example 1-3 modified with the rare earth element is less than 2.5 units, especially the loss of octane number caused by the hydrodesulfurization catalysts (GZ-1 and GZ-2) modified with Ce is less than 2 units.

In conclusion, the hydrodesulfurization catalyst provided by the present application can realize deep desulfurization of high-sulfur FCC gasoline (the sulfur content is >1500 ppn) under mild process conditions. After the hydrogenation reaction once, the sulfur content can fall to 40 ppm or even no more than 10 ppm, and the hydrodesulfurization catalyst has more excellent olefin protection function, with the final octane number loss of no more than 3.5 units, even no more than 2 units.

Finally, it should be noted that the foregoing embodiments are merely intended for describing the technical solution of the present application other than limiting the present application. Although the present application is described in detail with reference to the foregoing embodiments, persons of ordinary skill in the art should understand that they may still make modifications to the technical solutions described in the foregoing embodiments, or make equivalent substitutions to some or all of the technical features thereof. These modifications or substitutions do not make the essence of the corresponding technical solutions departs from the scope of the technical solutions of the embodiments of the present application.

What is claimed is:

1. A hydrodesulfurization catalyst comprising a modified catalyst carrier and a loaded active metal,
wherein
the modified catalyst carrier is a composite carrier prepared by mixing and calcinating γ-$Al_2O_3$ and an acid molecular sieve through a binder, and then modifying with the rare earth element;
the binder is amino trimethylene phosphonic acid (ATMP) or polyvinylpyrrolidone (PVP), and a mass ratio of the binder to a sum of the γ-$Al_2O_3$ and the acid molecular sieve is (1.5-3): 1;
the active metal is selected from more than two elements of VIB Group and VIII Group in a Periodic Table of Elements; and
the hydrodesulfurization catalyst is prepared by an impregnation method, wherein a molar ratio of an organic complexing agent in an impregnation solution to the VIII Group element is (0.3-2): 1.

2. The hydrodesulfurization catalyst according to claim 1, wherein a content of the rare earth element in the hydrodesulfurization catalyst is 0.5-5 wt % based on a weight of an oxide of the rare earth element with respect to a weight of the hydrodesulfurization catalyst.

3. The hydrodesulfurization catalyst according to claim 1, wherein the rare earth element is selected from at least one of La, Ce, Pr, and Y.

4. The hydrodesulfurization catalyst according to claim 2, wherein the rare earth element is selected from at least one of La, Ce, Pr, and Y.

5. The hydrodesulfurization catalyst according to claim 1, wherein the hydrodesulfurization catalyst is obtained by loading the active metal on the modified catalyst carrier using the impregnation method, and then aging and drying.

6. The hydrodesulfurization catalyst according to claim 2, wherein the hydrodesulfurization catalyst is obtained by loading the active metal on the modified catalyst carrier using the impregnation method, and then aging and drying.

7. The hydrodesulfurization catalyst according to claim 3, wherein the hydrodesulfurization catalyst is obtained by loading the active metal on the modified catalyst carrier using the impregnation method, and then aging and drying.

8. The hydrodesulfurization catalyst according to claim 4, wherein the hydrodesulfurization catalyst is obtained by loading the active metal on the modified catalyst carrier using the impregnation method, and then aging and drying.

9. The hydrodesulfurization catalyst according to claim 1, wherein a mass ratio of γ-$Al_2O_3$ to the acid molecular sieve is (9-1): 1; and/or, the acidic molecule sieve is selected from one or more of ZSM-5, MCM-41, SAPO-34, and Bata molecular sieve.

10. A preparation method of the hydrodesulfurization catalyst according to claim 1, characterized by comprising steps of:
loading a rare earth element on γ-$Al_2O_3$ by an impregnation method, then aging, drying, and calcinating to obtain a modified catalyst carrier; or mixing and calcinating γ-$Al_2O_3$ and an acid molecular sieve through a binder to prepare a composite carrier, and then loading the rare earth element on the composite carrier by the impregnation method, and then aging, drying, calcining to obtain the modified catalyst carrier;
loading an active metal on the modified catalyst carrier by the impregnation method, and then aging, drying, and calcinating to obtain the hydrodesulfurization catalyst.

11. The preparation method according to claim 10, wherein the modified catalyst carrier is obtained by loading an impregnation solution containing a rare earth compound on γ-$Al_2O_3$ or the composite carrier by an equal volume impregnation method, then aging at room temperature for 6-12 h, drying at 100-160° C. for 4-8 h, and calcining at 500-700° C. for 4-8 h; a calcination atmosphere is nitrogen, argon, or helium.

12. The preparation method according to claim 10, wherein the active metal is loaded on the modified catalyst carrier by an equal volume impregnation method, and an impregnation solution used contains an organic complexing agent, and the organic complexing agent is selected from at least one of citric acid, tartaric acid, and ethylenediaminetetraacetic acid.

13. A method for hydrodesulfurization of gasoline comprises contacting the gasoline with the hydrodesulfurization catalyst according to claim 1.

\* \* \* \* \*